No. 764,329. PATENTED JULY 5, 1904.
H. AIKEN.
FLUID MOTOR SYSTEM.
APPLICATION FILED MAR. 25, 1902.
NO MODEL. 6 SHEETS—SHEET 1.

WITNESSES
INVENTOR
Henry Aiken
by Bakewell & Byrnes
his attys

No. 764,329. PATENTED JULY 5, 1904.
H. AIKEN.
FLUID MOTOR SYSTEM.
APPLICATION FILED MAR. 25, 1902.
NO MODEL. 6 SHEETS—SHEET 3.

WITNESSES
INVENTOR

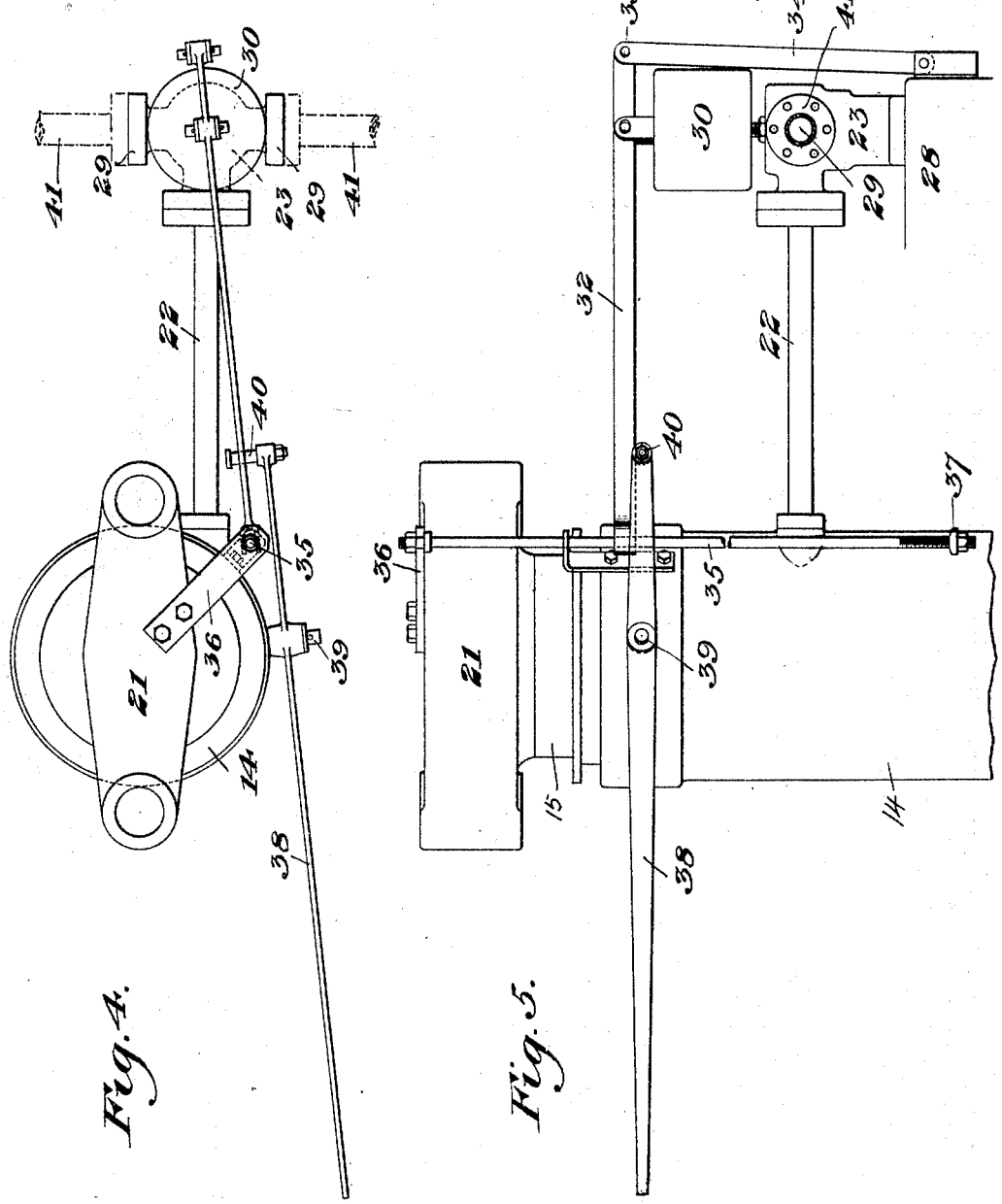

No. 764,329. PATENTED JULY 5, 1904.
H. AIKEN.
FLUID MOTOR SYSTEM.
APPLICATION FILED MAR. 25, 1902.
NO MODEL. 6 SHEETS—SHEET 5.

WITNESSES
INVENTOR
Henry Aiken
by Bakewell & Byrnes
his attys.

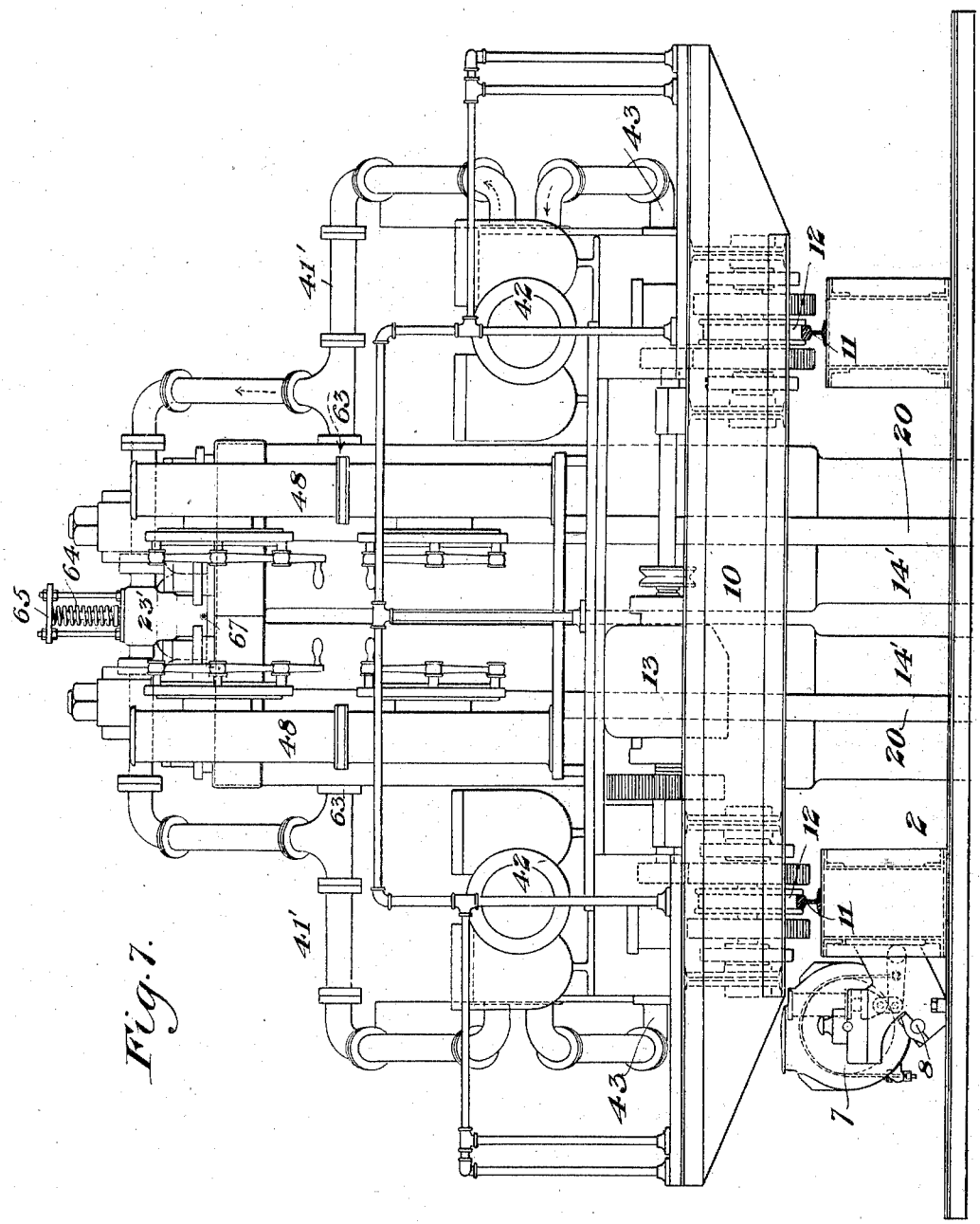

No. 764,329.

Patented July 5, 1904.

UNITED STATES PATENT OFFICE.

HENRY AIKEN, OF PITTSBURG, PENNSYLVANIA.

FLUID-MOTOR SYSTEM.

SPECIFICATION forming part of Letters Patent No. 764,329, dated July 5, 1904.

Application filed March 25, 1902. Serial No. 99,938. (No model.)

*To all whom it may concern:*

Be it known that I, HENRY AIKEN, of Pittsburg, Allegheny county, Pennsylvania, have invented a new and useful Fluid-Motor System, of which the following is a full, clear, and exact description, reference being had to the accompanying drawings, forming part of this specification, in which—

Figure 1:
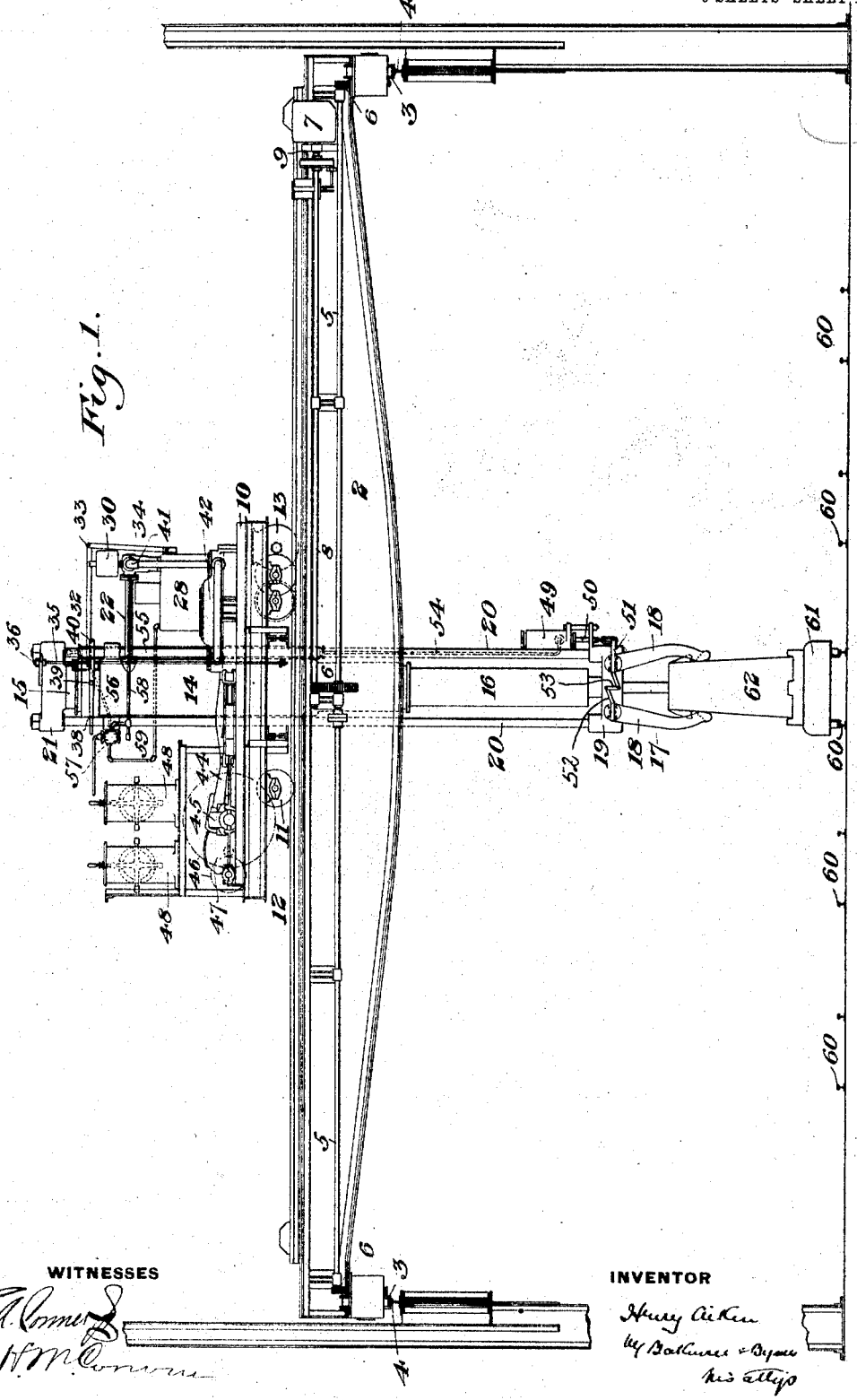
Figure 2:
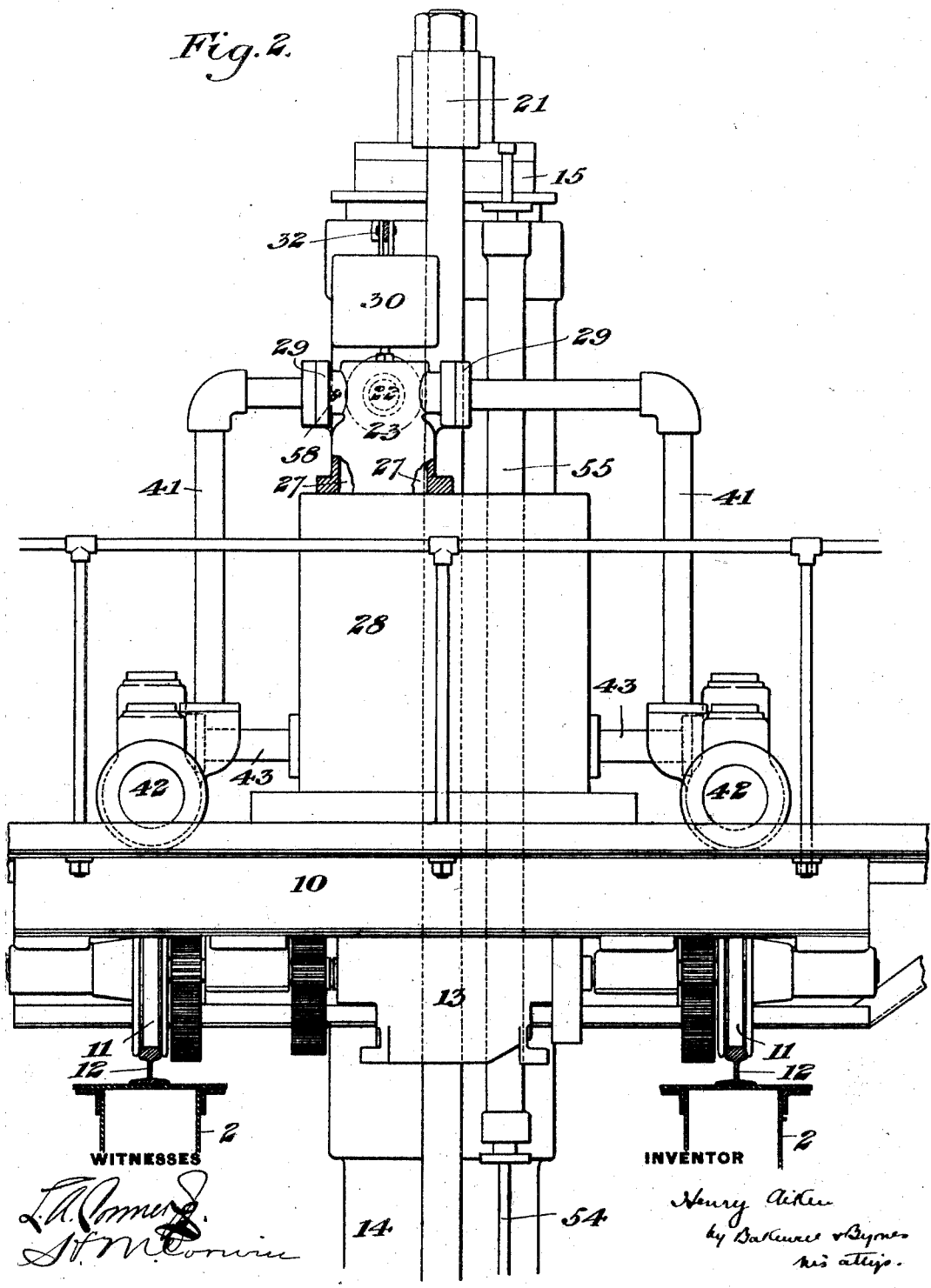
Figure 3:
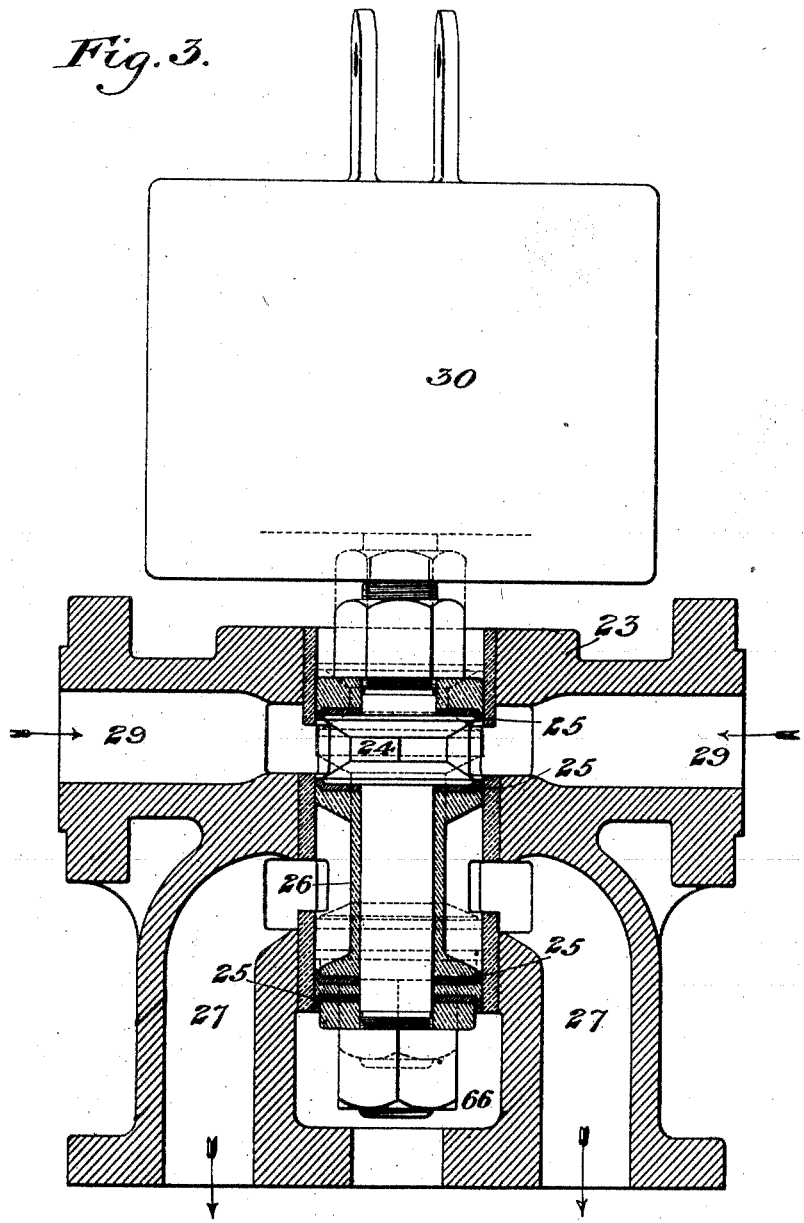
Figure 8:
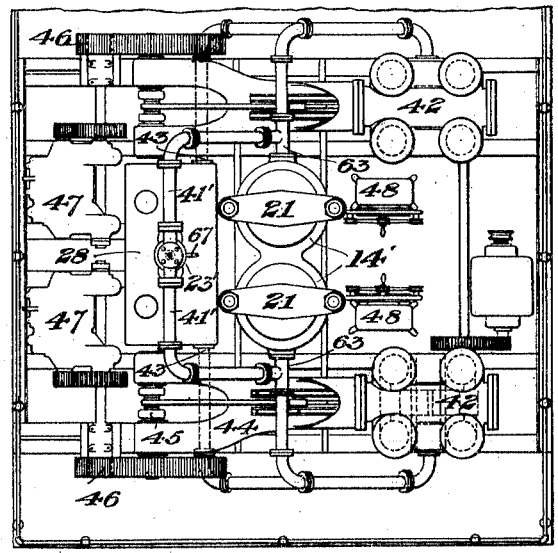
Figure 6:
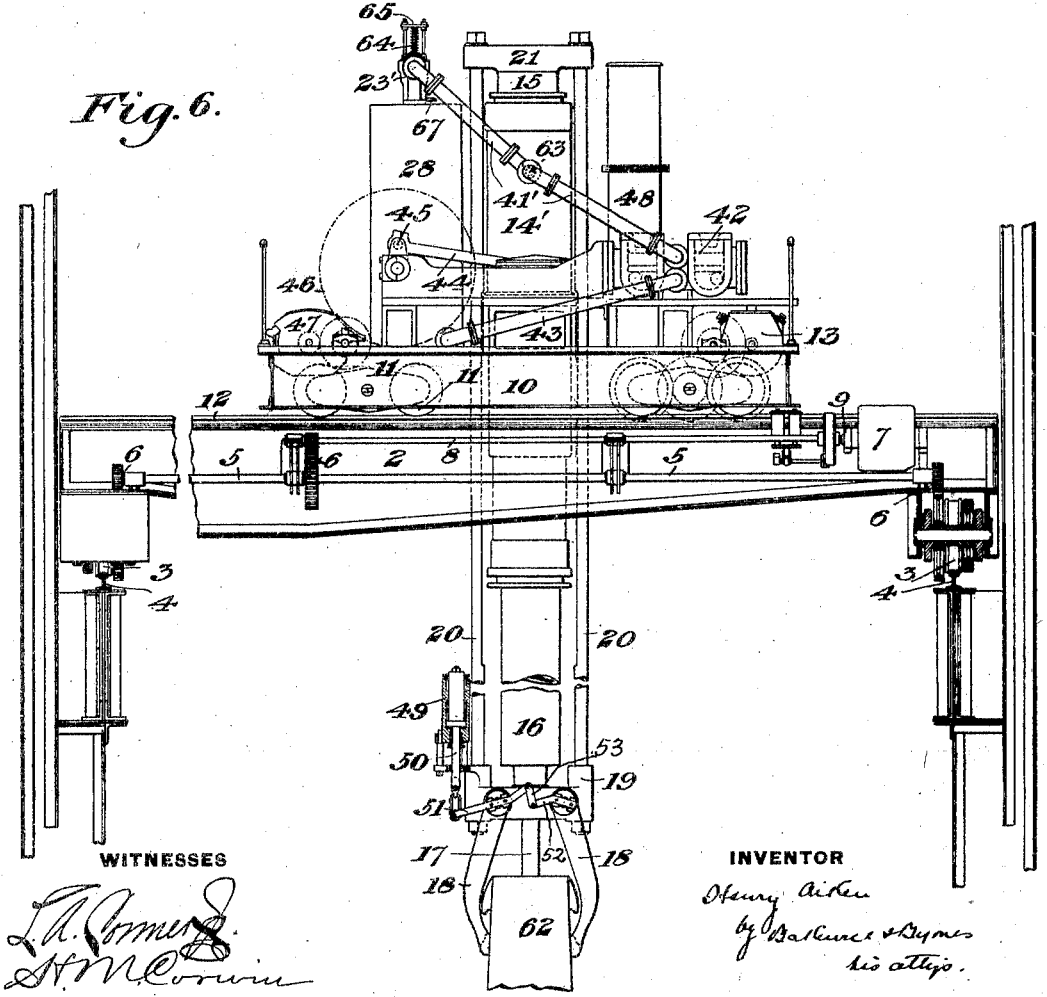

Figure 1 is a side elevation of an ingot-extractor having a motor system constructed in accordance with my invention. Fig. 2 is an enlarged end elevation showing the pumps, reservoir, and connections. Fig. 3 is a vertical section showing the valve mechanism. Figs. 4 and 5 are respectively a top plan and side elevation showing the controlling mechanism for the valve. Fig. 6 is a side elevation, partly broken away, showing the invention as arranged for operating two ingot-extractors. Fig. 7 is an end elevation, on a larger scale, showing the trolley mechanism of Fig. 6; and Fig. 8 is a top plan view of the trolley mechanism of Fig. 6.

My invention relates to the use of fluid-actuated motors mounted upon a traveling bridge or jib, and is designed to do away with the inconvenient and expensive fluid connections heretofore necessary with trolleys carrying lifting-cylinders; and it consists in providing upon the trolley a self-contained power system including a pump or pumps, a motor arranged to drive the pump, and a fluid-reservoir, the pumps, reservoir, and motive cylinder being provided with suitable connections; in arranging the connections so that the pumps may work continuously, whether the motive cylinder is being actuated or not; in providing automatic mechanism for reversing the motion of the cylinder; in providing hand-controlled mechanism by which the cylinder may be stopped at any desired point or started, and in other features of construction hereinafter described.

In the drawings, in which I show the invention applied to an ingot-extractor, referring to the form of Figs. 1 to 5, inclusive, 2 represents the bridge or jib of an overhead crane mounted upon wheels 3, which travel on the rails 4, extending over the yard containing the ingot-mold tracks. The actuating gear-wheels 6 for the crane are connected by a shaft 5, and this shaft is actuated by an electric motor 7, having a shaft 8 connected therewith by gearing 9. The trolley 10, carrying the parts of my apparatus, is carried on wheels 11, resting on rails 12, extending lengthwise of the bridge. This trolley may be driven by an electric motor 13, connected to trolley-wheels by intermediate gearing. The ingot-extractor consists of a vertical cylinder 14, the upper enlarged portion of which contains a ram 15, while the lower reduced portion carries a ram 16 of smaller diameter, carrying the holding-down stop 17, which rests upon the top of the ingot. I have shown the jaws or grips 18 as mounted upon a cross-head 19, connected by vertical rods 20 to the upper cross-head 21 of the larger plunger. The fluid-supply and exhaust pipe 22 leads into the vertical cylinder from a valve 23, (shown in Fig. 3,) the entrance-point of pipe 22 being shown in Fig. 2. The valve 23 consists of a vertical plunger having a reduced portion 24, with closing cup-leathers 25 on each side thereof, and a lower reduced portion 26, which communicates with exhaust-ports 27, leading downwardly to the reservoir 28. Supply-ports 29 lead from both sides of the valve into the annular port between cup-leathers 25, and when the parts are in the normal position (shown in Fig. 3) the ports communicate directly with the pipe 22 and the motive cylinder. The stem of the valve extends upwardly and is provided with either a weight 30, as shown in Fig. 3, or a spring, which acts to overcome friction in the valve and restore it to its normal position. The valve is lifted by a lever 32, pivoted to the valve through the weight and fulcrumed at 33 to a pivotal link 34. The end of the lever 32 is forked to embrace a tappet-rod 35, secured to bracket 36, fastened to the cross-head 21. The tappet-rod carries an adjustable tappet 37 at its lower end, which engages with and lifts the lever 32 as the top plunger reaches the upper end of its stroke, and to operate the lever 32 by hand I provide hand-lever 38, pivoted to the motive cylinder at 39 and carrying pin 40, engaging the under side of the lever 32. The inlet-ports 29 of the valve are connected by pipes 41 with the outlet-ports of two pumps 42, whose inlet-ports are connected by pipes 43 with the supply-tank 28. The pump pistons or plungers are driven by connecting-rods 44, leading to crank-shafts 45, which are driven through slow-motion gearing 46 from electric motors 47. The motor-controllers are shown at 48 in Fig. 1.

In the operation of the above-described apparatus the pumps are continuously driven, and when the control-valve is in the position shown in Fig. 3 the fluid under pressure will be forced into the cylinder and cause its plunger to rise. As the plunger rises the valve remains in its normal position until the tappet 37 strikes the valve-lever 32, when the valve will be lifted into the position shown in dotted lines in Fig. 3, and the pipe 22, together with the inlets 29, are then directly connected with the ports 27, leading back to the reservoir. In this position of the parts the pumps will drive the fluid into the valve and thence directly down into the reservoir and thence into the pumps in a continuous cycle, and the plunger will descend until the tappet lowers sufficiently to allow the weight 30 to move the valve back to its original position. If, however, the operator holds the lever 32 in lifted position, the plunger will descend to its lowest position and remain there as long as the operator holds the valve in such elevated position. It will be evident that by lifting the valve partially at any point in the stroke the operator can stop the plunger at any desired point and hold it there by allowing the fluid to bleed slowly through the valve, and hence complete control of the apparatus is afforded, the operator lifting the valve when he desires the plunger to descend, then releasing it when the plunger is to be lifted.

In order to swing the jaws or grips 18 outwardly to disengage them from the mold-lugs, I provide a small motive cylinder 49, secured to one of the rods 20 and having its piston-rod 50 loosely connected to a lever 51, connected to one of the jaws. The other jaw is provided with an inwardly-projecting lever 52, which is connected to the lever 51 by a pivotal link 53. The jaws will thus be opened simultaneously and positively and both moved in by gravity when the fluid is exhausted from the cylinder 49. The fluid-supply pipe 54 for this mold-cylinder moves telescopically within the fixed barrel 55, which is connected by pipe 56 to a hand-operated valve 57, connected to pipe 41 by supply-pipe 58. The exhaust-pipe 59 for the valve 57 leads back to the supply-tank 28, as shown in Fig. 1. The grips swing inwardly by gravity and are swung out when desired by means of the small motive cylinder described.

I have shown a series of parallel tracks formed of rails 60, extending below the traveling bridge, 61 representing one of the mold-trucks and 62 an ingot-mold resting thereon.

In Figs. 6, 7, and 8 I show a similar apparatus arranged to actuate two extractor-cylinders 14', a slight change being introduced in the connections and the means for operating the valve 23'. In this form the pipes 41', leading from the pumps, are provided with branches 63, which lead directly into the motive cylinders, and in this case the pipe 22, leading from the valve to the motive cylinder, is of course done away with. The pipes 41 lead into the ports of the valve similar to the ports 29 of Fig. 3, and the exhaust-ports 27 communicate with the reservoir, as before. To move the valve downwardly and hold it in the position shown in Fig. 3, I show an adjustable spring 64, compressed by cross-head 65, and to move the valve upwardly against the spring I close the space 66 (shown in Fig. 3) at the lower end of the valve-plunger and provide a pipe 67, which leads from a suitable hand-controlled valve into this space 66. The operator by thus controlling the fluid-pressure below the valve can thus elevate it or move it as desired. The operation of this latter form is the same as that of the first form, two ingots being stripped simultaneously.

The advantages of my invention result from the doing away with the cumbersome hydraulic connections to the motors on the traveling trolley, from the use of the reservoir which enables the pumps to be driven continuously, and from the peculiar valve and connections which give complete control of the motor.

The system may be applied to any fluid-motor on a traveling jib or bridge, whether used for ingot-extracting or for other purposes, and many changes may be made in the construction and arrangement of the parts within the scope of my invention as defined in the claims.

I claim—

1. A movable bridge or jib, a trolley mounted thereon and carrying the following elements: a motive cylinder having a vertically-movable element, a pump arranged to actuate such movable element, a motor arranged to drive the pump continuously, a reservoir connected to the pump and the cylinder, valve mechanism in the connection leading from the pump-outlet to the reservoir, and means controlled by the upwardly-movable element of the cylinder and arranged to automatically actuate the valve; substantially as described.

2. An ingot-extractor, comprising a movable bridge or jib, a trolley mounted thereon and carrying the following elements: an ingot-extracting motive cylinder, a pump arranged to actuate the movable element of said cylinder, a motor arranged to drive the pump continuously, a separate reservoir connected to the pump and the cylinder, valve mechanism interposed in the connection leading from the pump-outlet to the reservoir and arranged to control the flow through said pipe, and connections operated by the upward stroke of the extracting-cylinder and arranged to open the valve and limit the upward movement, substantially as described.

3. A movable support carrying a lifting-cylinder, a pump arranged to actuate the cylinder, and a reservoir connected to the pump and the cylinder, a valve controlling the flow from the pump to the reservoir, means for exerting yielding pressure upon said valve in one direction, and automatic mechanism actuated by the upward stroke of the lifting-cylinder for moving the valve against said yielding pressure; substantially as described.

4. A movable support carrying a lifting-cylinder, a pump arranged to actuate the cylinder, a reservoir connected to the pump and cylinder, a valve controlling the flow from the pump to the reservoir, means for exerting yielding pressure upon said valve in one direction, and a tappet carried by the movable element of the motor and arranged to actuate the valve; substantially as described.

5. A movable support carrying a lifting-cylinder, a pump arranged to actuate the cylinder, a reservoir connected to the pump and the cylinder, a valve controlling the flow from the pump to the reservoir, means for exerting yielding pressure upon said valve in one direction, and a hand-lever arranged to actuate the valve in opposition to the yielding pressure; substantially as described.

In testimony whereof I have hereunto set my hand.

HENRY AIKEN.

Witnesses:
  H. M. CORWIN,
  L. M. REDMAN.